Patented Jan. 15, 1935

1,988,005

UNITED STATES PATENT OFFICE 1,988,005

CABLE CONDUCTOR IMPREGNATING MATERIAL AND ITS METHOD OF PRODUCTION

John J. Gilbert, Douglaston, N. Y., and Frank S. Malm, Chicago, Ill., assignors to Bell Telephone Laboratories, Incorporated, New York, N. Y., a corporation of New York No Drawing. Application August 21, 1931, Serial No. 558,641. In Great Britain October 31, 1930

4 Claims. (Cl. 18—50)

This invention relates to pressure equalizing compositions of depolymerized india rubber, gutta percha, balata, or like materials and the manufacture and application of such compositions for impregnating stranded conductors and for equalizing the pressure on the continuously applied tape or wire of loaded conductors.

By depolymerized india rubber, gutta percha, balata, or the like it is intended to signify such materials which, from a coagulated or natural condition, without vulcanization, have had their natural structure broken down, for example by milling or rolling and/or by mastication under heat. Such treatment of depolymerization when applied to india rubber, for example, in the form of thin, pale, plantation crepe results in a material which is a viscous fluid or is plastic at normal temperatures and which is sometimes known as melted rubber.

The present invention consists in a composition of depolymerized india rubber, gutta percha, balata, or like material containing an added proportion of one or more anti-oxidants which latter materials are well known and commonly used in the art of vulcanizing india rubber and the like.

Depolymerized rubber or melted rubber may be used as a pressure equalizing material and for other purposes in submarine electric signaling cables both loaded and unloaded. Such cables consist of an electrically conducting core, either loaded with magnetic material or not and enclosed within an electrically insulating sheath, the core and magnetic material, if any, being impregnated with a viscous fluid pressure equalizing material, in such manner that the magnetic loading material, if any, is substantially floating in the material. It has been found when depolymerized or melted rubber is utilized for such purposes in a submarine electric cable that a green substance is sometimes formed. The formation of this green substance appears to indicate that chemical action, such as oxidation, is proceeding.

According to the invention, therefore, depolymerized india rubber, gutta percha, balata, or like material containing an added proportion of one or more anti-oxidants is utilized for the impregnation of the conducting core of a submarine electric signaling cable.

A feature of the invention, therefore, consists in a submarine electric signaling cable having an electrically conducting core either loaded with magnetic material or not and enclosed within an electrically insulating sheath, wherein the conducting core and magnetic material, if any, are impregnated with a viscous fluid material consisting of depolymerized india rubber, gutta percha, balata, or the like containing an addition of one or more anti-oxidants.

Many anti-oxidants are well known in the art of vulcanization of rubber and included are such substances as aldol-alpha-naphthylamine, diphenyl-ethylene-diamine, acetaldehyde-ethylene-diamine. These anti-oxidants are sold under certain trade names, examples being "Stabilite", "Agerite resin", and "V. G. B.". These anti-oxidants are members of a group which have been found to be relatively insoluble and to have properties superior to other anti-oxidants when employed in unvulcanized compositions used for insulating under-water cables. They are not soluble in water to an extent greater than about 0.007 grams for 100 c. c. of water at 100° C.

In the preparation of depolymerized materials particularly depolymerized or melted rubber, it has been noticed that increased duration and temperature of mastication to secure decreased viscosity or increased plasticity or fluidity is, in general, accompanied by deterioration of the properties of the compositions as an electrical insulator. In general, the quotient of the specific leakance of the material and the specific inductive capacity of the material $$\left(\frac{G}{C}\right)$$

tends to increase with increased mastication. The increase of this quotient is highly undesirable in compositions which are to be used for electrical purposes, particularly in high-grade submarine electric signaling cables designed for the transmission of voice or other high frequency currents. This change in the electrical properties of the composition during mastication appears to be due, at least in part, to oxidation.

According to the present invention one or more anti-oxidants are introduced into the composition during or before milling or mastication, preferably before the temperature of the composition is materially raised above ordinary atmospheric temperature.

In one process of preparing depolymerized or melted rubber the raw material utilized is thin, pale, plantation crepe rubber. This crepe rubber is first washed in a rubber washing machine at about 60° C. for about one hour in distilled water. The rubber is then broken down and dried in a mill which consists of rolls rotating at different peripheral speeds. Thereafter the broken down rubber is further dried either by the application of heat or a vacuum process or both. The dried rubber is then placed in a kneading or masticating machine, approximately the normal atmospheric temperature, and is kneaded or masticated therein for two and a half hours, or more, or less according to the degree of plasticity required, the temperature of the rubber meanwhile being raised to about 250° C. The kneading machine is then drained while still hot and the viscous mass exuded therefrom is strained while still hot through a sieve to remove foreign particles and lumps if any be present. The viscous mass is then cooled to about 150° C. and thereafter placed in a vacuum vessel which is exhausted to a residual pressure of about 6 c. m. of mercury. The vacuum vessel is maintained at a temperature of about 98° C. for about two hours, as the result of which the mass of depolymerized rubber therein should be thoroughly freed from occluded gases, and volatile matter.

According to the invention one or more anti-oxidants, preferably those having the characteristics mentioned above, are added during the milling of the sheets of crepe or it may be added to the rubber when this is placed in the kneading machine and before the temperature is materially raised.

The addition of the anti-oxidant at an early stage in the process of depolymerizing the rubber tends to prevent oxidation of any of the constituents of the rubber during the time when it is subjected to treatment in the presence of air and particularly during the periods when the temperature is raised.

Since certain anti-oxidants tend to distill off when subjected to high temperatures, if they are added to the rubber in an early stage in the process of depolymerizing the rubber, some of the anti-oxidants may be lost when the rubber is heated and, therefore, may be present in insufficient quantity after the depolymerizing treatment to effect the desired result. In this case an additional quantity of the anti-oxidant may be introduced into the prepared material during a stage of the process subsequent to the stage at which the material is subjected to high temperatures.

Furthermore, it is believed that the presence of anti-oxidants introduced after the heat treatment of the material may tend to prevent what may be termed "re-polymerization" or a setting or hardening of the material and it may be advisable to add additional anti-oxidants after the heat treatment of the rubber for this purpose.

What is claimed is:

1. As an insulating pressure equalizing and/or impregnating material for cables, a composition of matter comprising at least semi-fluid depolymerized natural rubber mixed with an anti-oxidant not soluble in water to an extent greater than 0.007 gram per 100 c. c. of water at 25° C.

2. A composition in accordance with claim 1 in which the anti-oxidant comprises aldol-alpha-naphthylamine.

3. A composition in accordance with claim 1 wherein the anti-oxidant comprises diphenyl-ethylene-diamine.

4. A composition in accordance with claim 1 wherein the anti-oxidant comprises acetaldehyde-ethylene-diamine.

JOHN J. GILBERT.
FRANK S. MALM.